United States Patent Office 2,780,474
Patented Feb. 5, 1957

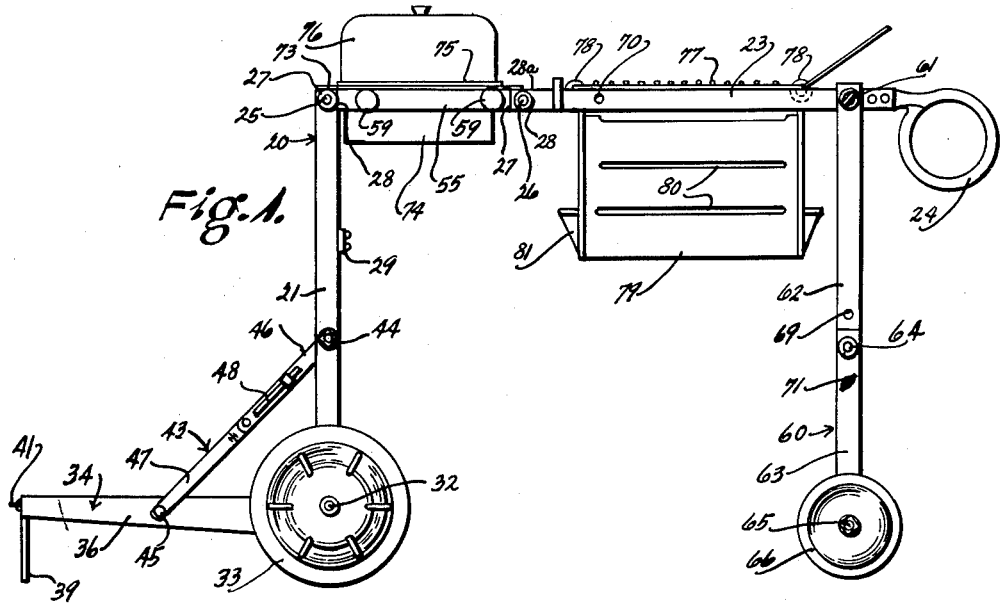

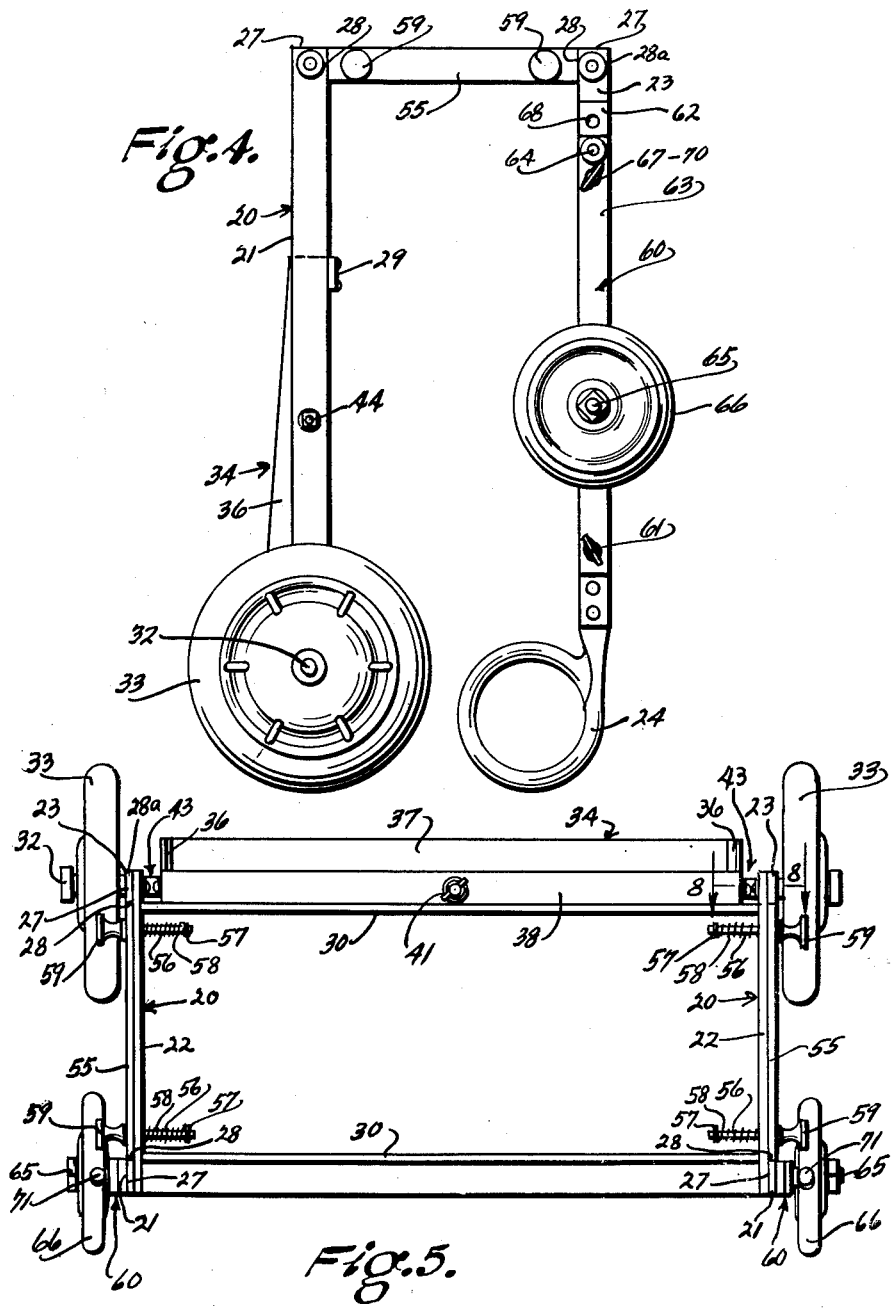

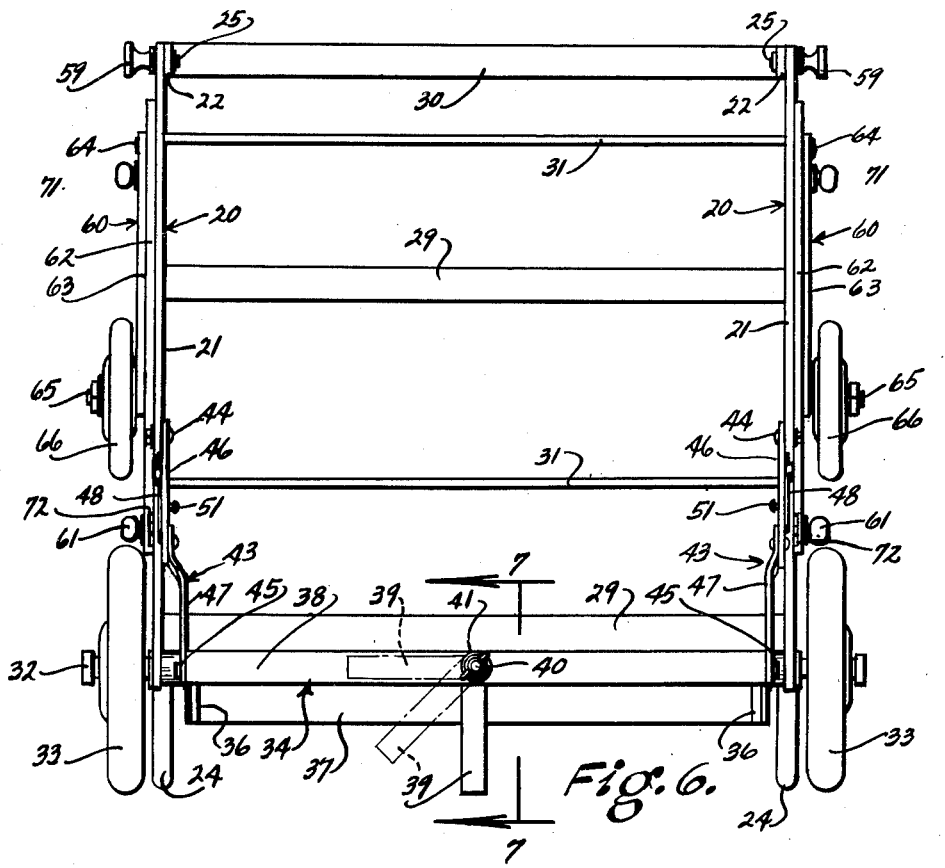
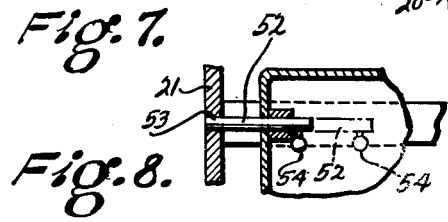
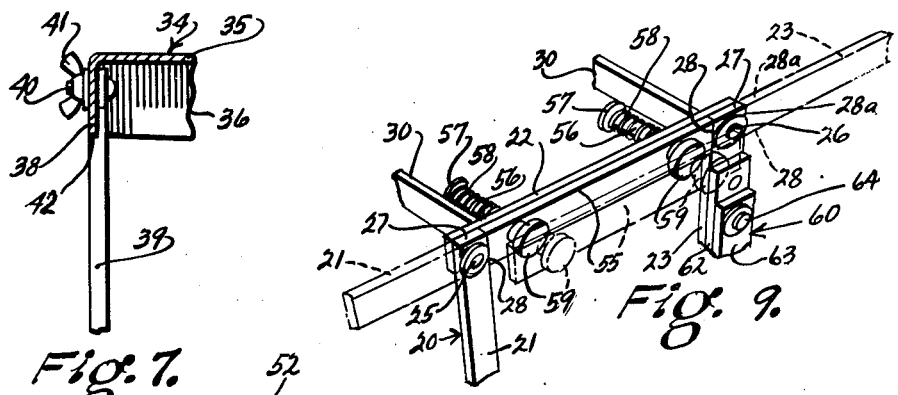

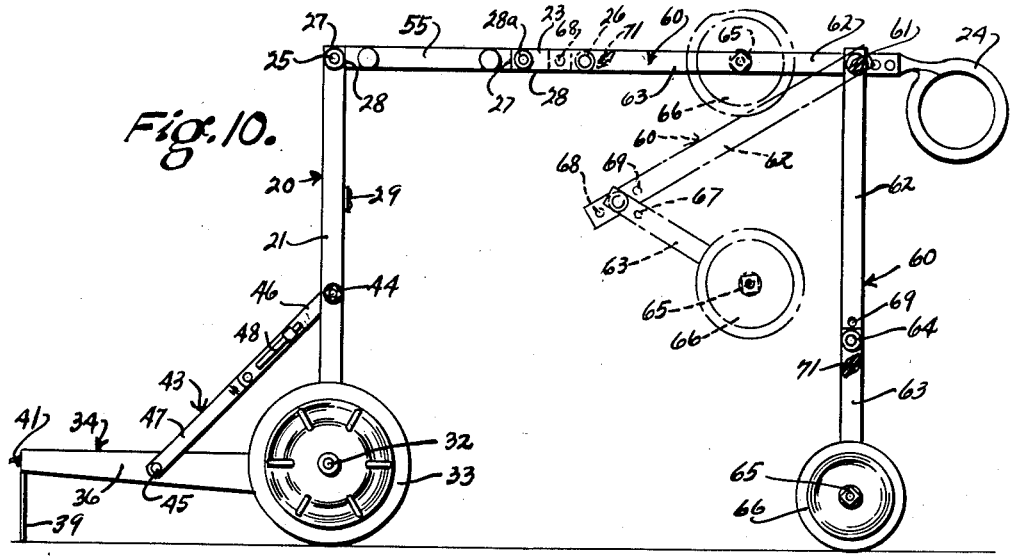
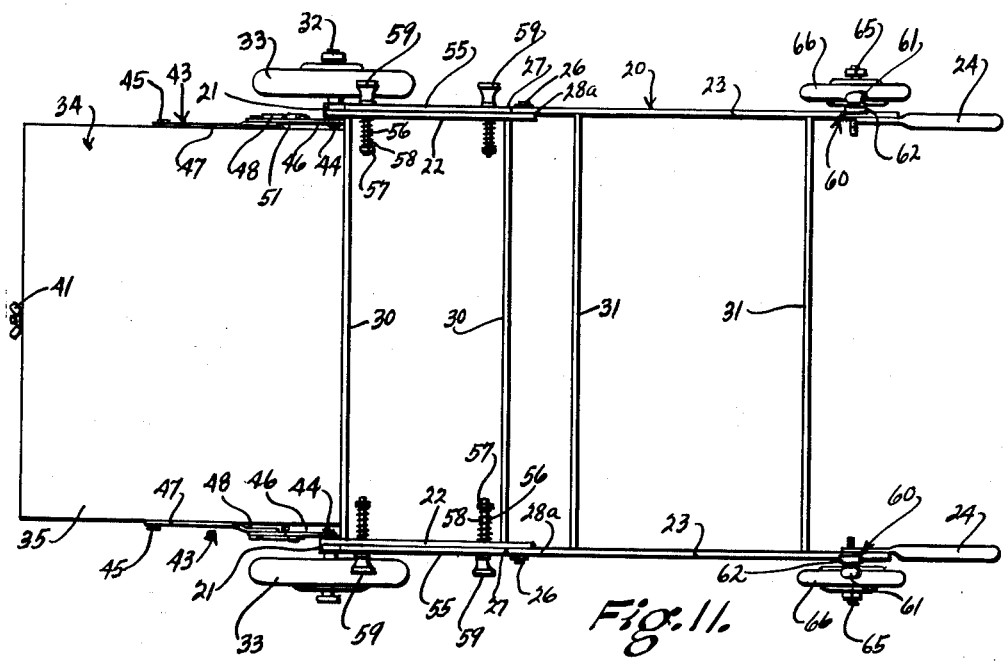

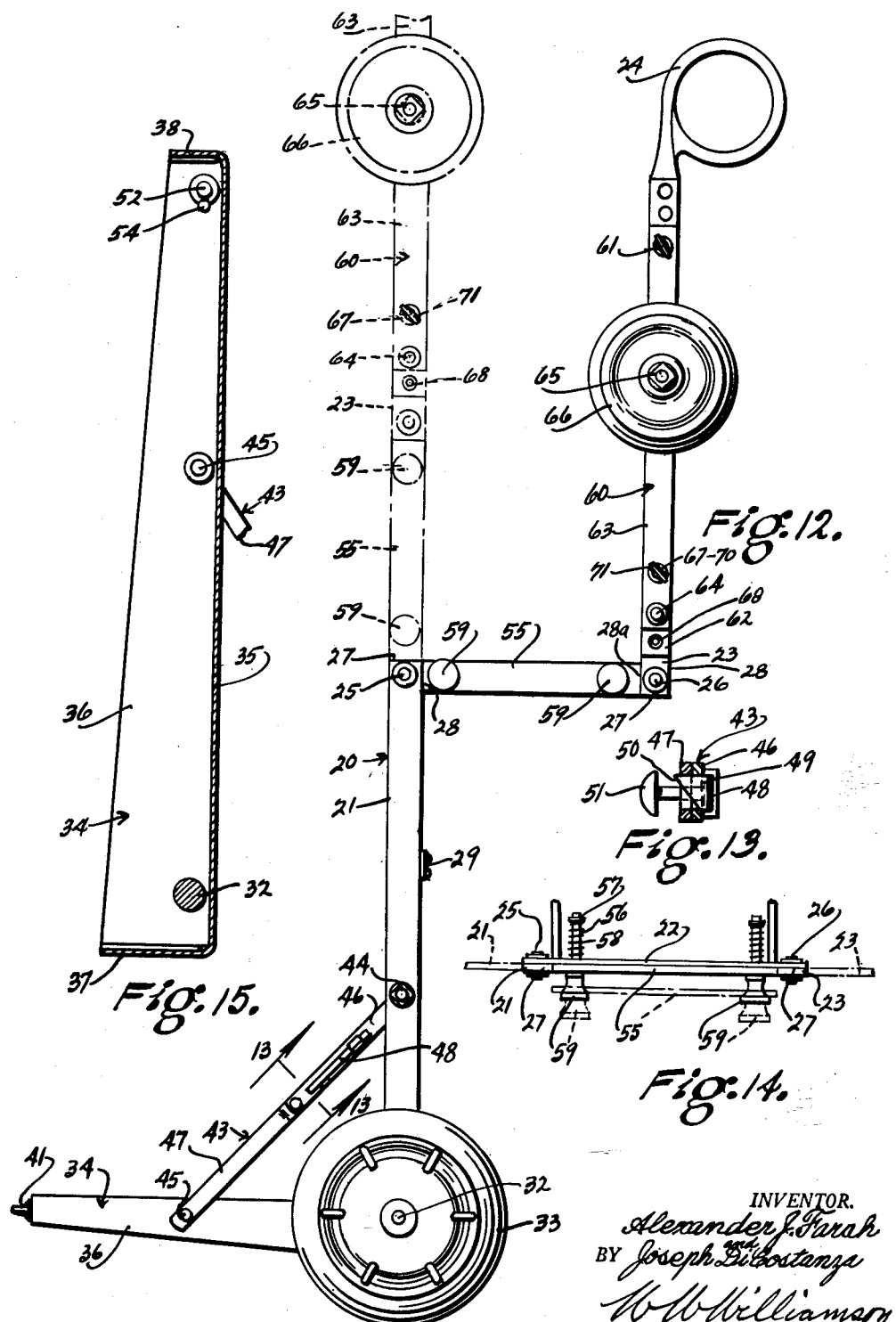

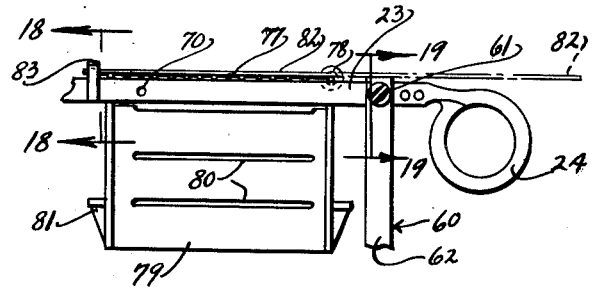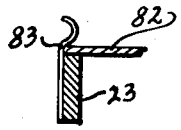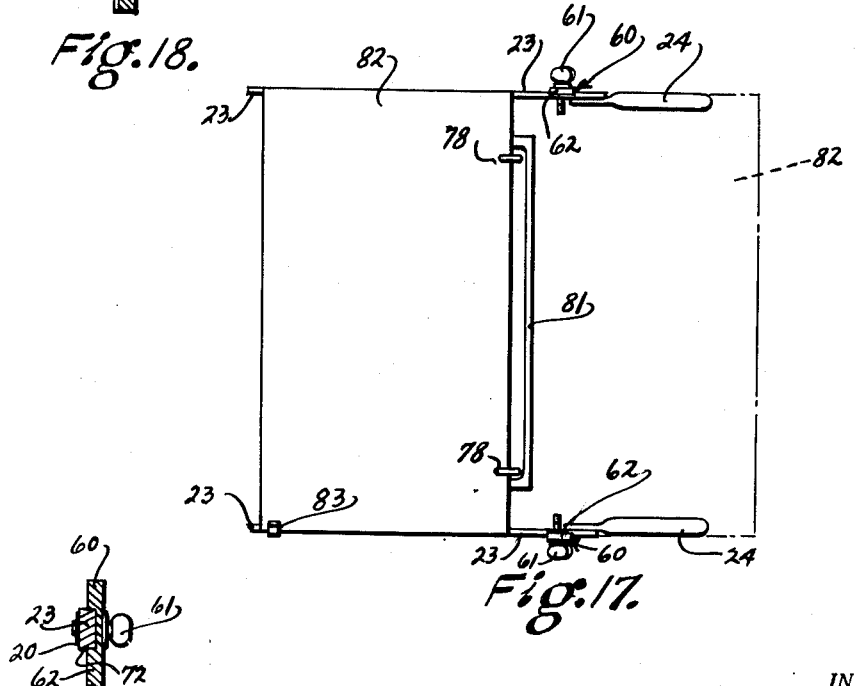

2,780,474
COMBINATION PICNIC CART

Alexander J. Farah, Lenni Mills, and Joseph Di Costanza, Milmont Park, Pa.; said Di Costanza assignor to said Farah Application April 15, 1954, Serial No. 423,366

7 Claims. (Cl. 280—41)

Our invention relates to a new and useful combination picnic cart and has for one of its objects to produce a convenient light weight device of this character which may be folded into a compact package for storing and/or transportation purposes in a small compartment such as the trunk of an automobile.

Another object of the invention is to provide a combination picnic cart structure capable of being contracted into a small package, as by folding certain elements thereof upon one another, and expanding or extending the elements into a number of different positions to constitute various types of articles, such as a hand-truck, a cooking implement, a pantry and the like.

Another object of the invention is to produce a foldable or collapsible and extensible structure provided with wheels whereby the formed article may be readily moved about with very little effort.

A further object of this invention is to produce a structure in which the foldable elements can be unfolded and positioned in certain predetermined locations to provide a wheeled hand-truck having an extended platform whereby relatively large beverage boxes or coolers, folding picnic chairs and other weighty items may be easily transported from an automobile to the place of use, such as a picnic grounds.

A still further object of the present invention is to produce a combination article of manufacture capable of being adjusted to various positions to constitute a number of different items having distinct uses.

With the above and other objects in view this invention consists of the details of construction and combination of elements hereinafter set forth and then designated by the claims.

In order that those skilled in the art to which this invention appertains may understand how to make and use the same we will describe its construction in detail referring by numerals to the accompanying drawing forming a part hereof, in which:

Fig. 1 is a side elevation of a picnic cart constructed according to our invention and shown in a certain open or expanded condition, particularly when used for cooking and serving food, with a portion fo the cover plate broken away and swung into a partially open position for purpose of illustration.

Fig. 2 is a top plan view of Fig. 1 with the cover plate partly broken away and also a part broken out to permit illustration of certain details of construction.

Fig. 3 is an enlarged fragmentary sectional view on the line 3—3 of Fig. 2.

Fig. 4 is a side view, on a slightly enlarged scale, of the apparatus folded, contracted or collapsed and the grille and pantry appliances removed as for storage or transportation purposes.

Fig. 5 is a top plan view of Fig. 4.

Fig. 6 is a front elevation thereof with the step down and supported by a swinging foot and showing other positions of said foot in dotted lines to indicate the manner of swinging it into an inoperative position.

Fig. 7 is an enlarged fragmentary section on the line 7—7 of Fig. 6.

Fig. 8 is also an enlarged fragmentary sectional view on the line 8—8 of Fig. 5 illustrating one means for retaining the platform in a folded or raised position.

Fig. 9 is a fragmentary perspective view of the locking mechanism for the articulated sections of the side rails and illustrating the manner of releasing said locking mechanism and how it holds the side rail elements in different positions.

Fig. 10 is a side elevation of the picnic cart body without accessories, to illustrate certain details of construction, and partially opened into a predetermined position for use as, for example, a wheeled table or stand, and also depicting in dotted lines the manner of folding the articulated legs of the secondary wheels.

Fig. 11 is a top plan view of Fig. 10.

Fig. 12 is a side elevational view of the apparatus extended into another position and usable for another purpose and also illustrating in dotted lines the device fully extended for employment as a hand-truck, the handles in the dotted line showing being broken off.

Fig. 13 is an enlarged detail section of one of the foldable braces or hangers for the platform on the line 13—13 of Fig. 12 to illustrate the latch.

Fig. 14 is an edge view of one of the locking mechanisms for the side rail sections.

Fig. 15 is an enlarged sectional view of the platform taken on a line extending from front to rear thereof.

Fig. 16 is a fragmentary side elevation similar to Fig. 1, showing in detail the arrangement, location and relation of the grille and cover plate to the cart body and showing said cover plate in an open position in dotted lines.

Fig. 17 is a top plan view of Fig. 16.

Fig. 18 is an enlarged fragmentary section on the line 18—18 of Fig. 16.

Fig. 19 is a detail section on the line 19—19 of Fig. 16.

In carrying out our invention as herein embodied 20 represents a pair of companion parallel jointed side rails each consisting of a forward limb 21, a bridge member 22 and a rear limb 23 terminating in a handle 24.

The bridge member 22 is offset relative to the forward and rear limbs 21, 23, respectively, and inwardly with relation to the complete body structure so that the limbs of each side rail are in the same plane. The forward and rear limbs of each side rail are articulated or pivoted face to face on the opposite ends of the bridge member 22, Fig. 9 as indicated at 25 and 26, respectively. The axes of the pivots of the respective limbs are equi-distant from the end and an adjacent side edge to provide shoulders 27 and 28 and on the rear limb 23 an additional side edge shoulder 28a for cooperation with locking mechanism to be presently described.

The two companion side rails 20 are held in rigid parallel relation by cross-bars 29 between the forward limbs 21 of said rails, other cross-bars 30 between the bridge members 22 and still other cross-bars 31 between the rear limbs 23.

Appropriately mounted in or on the lower ends of the companion forward limbs 21 of the jointed side rails 20 and extending across the space between said forward limbs is an axle 32 having its ends protruding beyond and outside of the outer faces of the forward limbs 21 for the reception of the primary wheels 33.

On the axles 32 within the space between the forward limbs 21 is swingingly mounted a platform 34 including, preferably, a floor 35, depending perpendicular side walls 36 having oblique outer or free edges, Fig. 15, converging towards said floor from the back wall 37 to the front wall 38 which front and back walls are also perpendicular dependent to the floor but the former is shorter than the latter. The mounting of the platform on the axle 32 is accomplished by projecting said axle through the side walls 36 of said platform. A foot 39, Fig. 7, is located against the inner surface of the front wall 38 of the platform 34 and swingingly mounted on a bolt 40 passing through an end of said foot and said platform front wall 38 with a wing nut 41 screwed onto the protruding end of said bolt 40. The foot can be swung laterally to a position behind the platform front wall, Fig. 6, or dropped into an upright position for providing an extra support to the front of the platform when in its lowered position to prevent tilting of the apparatus especially while the platform is supporting a load. To relieve undue pressure on the bolt 40 the foot 39 is provided with a shoulder 42, Fig. 7, which engages the edge of the front wall 38 when said foot is swung out perpendicular to the floor of the platform.

The platform 34 is primarily supported in its lowered position by foldable side brackets, braces or hangers 43, one at each side of the apparatus, and each bracket is pivoted at opposite ends to the inner surfaces of the forward limbs 21, as at 44, and to the outer surfaces of the platform side walls 36, as at 45. Each bracket 43 comprises a rear section 46 and a forward section 47, the latter being bent in offset fashion as plainly shown in Fig. 6. A flat spring latch 48 has one end fixed to the rear section 46 of each bracket 43 with the free end bent flatwise to provide a nose 49, Fig. 13, with a beveled edge 50 for projection through aligned openings in the coating sections of the respective brackets, when the brackets are open or extended and with the platform lowered, to temporarily retain said brackets open and prevent accidental elevation of said platform. The inherent resiliency of the spring latch 48 constantly urges the nose 49 towards the forward bracket section 47 so as to enter the opening in said forward bracket section and said nose is retracted manually by pressing upon the headed pin 51 projecting through the rear bracket section 46 and fixed to said latch 48.

Upon retraction of the associated latch nose 49 the brackets 43 can be folded and the platform raised and holding means is provided to retain said platform elevated. Such a holding means is shown in Figs. 8 and 15 where a sliding barrel bolt 52 is illustrated as mounted on the platform and projecting through a side wall thereof for selected entrance into a keeper hole 53 in one of the forward limbs 21 of a side rail, said bolt 52 having a knob 54 for easy manipulation.

For holding the bridge member 22 and the limbs 21, 23 of each jointed side rail 20 in various adjusted positions there is provided a locking mechanism consisting essentially of a locking plate 55 of a length equal to the space, for example, between the opposed side edges of the two side rail limbs 21 and 23 so as to snugly fit against either of the shoulders 27, 28 of the forward limb 21 and/or the shoulders 27, 28, 28a of the rear limb 23 according to the adjusted positions of said limbs relative to the bridge member 22. Each locking plate 55 is fixed to a pair of rods 56 slidably mounted on and projecting through holes in the associated bridge member and the ends of said rods remote from the locking plate have heads 57 against which rest the ends of springs 58, one on each pin, and the opposite ends of said springs engage the inner face of the bridge member to thereby urge the rods inward and the locking plate flatwise against the outer flat face of said bridge member. When said locking plate is in operative position the ends thereof engage predetermined shoulders of the side rail limbs and prevent the latter from turning on their pivots. Appropriate means is provided to manually release the locking plate and for such purpose knobs 59 are fixed to the outer face thereof. In fact it is possible that said knobs 59 may be parts of the rods 56.

On each side rail rear limb 23 is pivotally and adjustably mounted a foldable leg 60 by means of a thumb screw 61 projected through an end of said leg and screw threaded into its respective side rail adjacent the handle end thereof. Each foldable leg 60 consists of a long inner section 62 and a short outer section 63 and it is the inner end of said long inner section that is pivoted to its respective side rail. The inner end of the outer section 63 is pivoted in overlapping fashion to the outer or free end of the inner section at 64 so that said outer section 63 can swing in a plane parallel to the inner section 62 about said pivot 64. At the outer or free end of each short outer leg section 63 is a trunnion 65 on which is journalled a secondary wheel 66.

A hole 67, Fig. 10, is formed through the short outer leg section 63 adjacent the pivot 64 between the latter and the location of the trunnion 65 or the outer free end of said outer leg section. This hole 67 is selectively alignable with a threaded hole 68 in the longer inner leg section 62 outwardly of the pivot point 64 or a plain hole 69 through said longer inner leg section 62 inwardly of said pivot point 64 wherefore each of the holes 67, 68 and 69 are equidistant from the pivot 64. When the leg sections are folded upon each other and the respective side rail the aligned holes 67, 69 align with the threaded hole 70, Fig. 1, in the rear side rail limb 23 distant from the pivot screw 61. A thumb screw 71 is selectively inserted in the three aligned holes 67, 69 and 70 when the leg 60 is folded on its side rail to hold the leg in such position or inserted in the two aligned holes 67 and 68 when the leg is unfolded in order to hold the foldable leg in extended condition as shown in Fig. 1. To hold each leg structure 60 rigidly or firmly perpendicular to its respective rear side rail limb section 23 the long inner leg section 62 has a transverse slot 72, Figs. 6 and 19, on its inner face in the region of the pivot screw 61 to snugly receive its respective side rail section and the shoulders formed by said slot engage the opposite edges of the respective side rail when the thumb screw 61 is screwed tightly into place.

A frame 73, Figs. 1, 2 and 3, is fixedly mounted on the bridge members 22 and their connected cross-bars 30 to receive the removable pantry receptacle 74 which has a border ledge 75 to rest on the top surface of said frame at the inner edges thereof. The interior of the pantry receptacle is divided into a plurality of compartments to hold knives, forks, spoons and various types of condiment and food containers and may be closed by a cover 76.

A grille 77, Figs. 1 and 2, is mounted on the cross-bars 31 between the side rail limbs 23 and fastened in place by rings 78 or equivalent attaching means and from the ends of the grille at the sides of the cart depend appropriate hangers 79 which may have ribs 80 at different heights when the grille is in use to support a pan 81 to hold heat producing means such as charcoal, coke or coal briquets beneath the grille.

To cover the grille when not in use, a cover plate 82, Figs. 1, 2, 16, 17 and 18, is provided which is large enough to extend completely over the grille and across the rail limbs 23. The cover plate 82 is articulated on the grille along a longitudinal edge by certain of the rings 78 whereby said cover plate may be swung back and forth to expose the grille or cover the same as desired. When in the open position to expose the grille said cover plate rests on the handles 24 and adjacent portions of the side rail limbs 23 while in the closed position it rests on the grille and may be retained in said closed position by a spring catch 83. This will prevent the cover plate from dangling about when the cart is in certain positions or clattering while being transported over rough surfaces. The cover plate can be used as a table top in either position, especially if there is no fire in the fuel pan and when over the grille said cover plate can be used as a hot plate or frying utensil.

In operation, the forward and rear limbs and their components can be folded relative to the bridge members and their components until said forward and rear limbs project in the same direction and are substantially parallel as shown in Fig. 4. This provides a compact package for storage or transportation in a vehicle, such as the trunk compartment of an automobile, and the device may be stood up on a horizontal surface as the then bottom portions of the primary wheels 33 and the handles 24 are in the same plane.

Upon reaching a destination where the apparatus is to be used the rear limbs 23 of the side rails and their components may be swung into a position directly opposite to that shown in Fig. 4, as illustrated in full lines in Fig. 12, by first withdrawing or releasing both locking plates 55 and permitting said locking plates to assume the locking positions after adjustment of the side rail rear limbs. Upon dropping the platform 34 the device can then be utilized as a type of hand truck by supporting articles on said platform and on the bridge members and their components. In a similar manner the bridge members and the rear side rail limbs can be further adjusted until all of the elements of both of the respective side rails are in endwise alignment as shown partly in elevation and partly in dotted lines in Fig. 12 thus providing, in effect, a conventional hand truck to transport a beverage refrigerator box, boxes of bottled beverages, folding chairs and the like from a vehicle to a picnic grounds or similar area.

Upon reaching a picnic location the bridge members with the rear limbs in endwise alignment may be adjusted until they are at right angles to the side rail forward limbs as illustrated in Figs. 1 and 10. At that time the folded legs 60 can be dropped down by removing the thumb screws 71 and loosening the pivot thumb screws 61. After the legs are unfolded and dropped, the thumb screws 71 are replaced to engage the holes 67 and 68 in the respective sections 63 and 62 of the two foldable legs 60 and, finally, with the notches 72 in registration with their respective side rail limbs 23 the pivot thumb screw 61 is tightened to hold the unfolded legs in upright positions. The secondary wheels are now on the same surface as the primary wheels and the cart is in condition for cooking and other desirable operations. It will be apparent that the cart can be located at a distance from the picnickers during preparation of the food and then wheeled over to them for serving.

A cart constructed in the manner described has many uses too numerous to mention but persons utilizing the same will readily visualize many instances where it can be employed to advantage after becoming familiar with the various forms into which it can be adjusted.

Of course we do not wish to be limited to the exact details of construction herein shown and described as these may be varied within the scope of the appended claims without departing from the spirit of our invention.

Having described our invention what we claim as new and useful is:

1. A combination picnic cart comprising a frame consisting of three articulated sections each including side rail elements to which cross-bars are secured, handles at the outer ends of the side rail elements of one of the outer frame sections, a pair of primary wheels mounted at the outer end of the other outer frame section, said outer frame sections being of substantially the same length whereby when both of said outer frame sections are swung into substantially parallel positions at right angles to the intermediate frame section said primary wheels and handles may rest upon the same horizontal surface, said frame sections also adapted to be adjusted whereby all of them are in endwise alignment or the intermediate frame section and the outer frame section with the handles are in endwise alignment but at right angles to the other outer frame section or both outer frame sections project in opposite directions at right angles to the intermediate frame section, locking mechanisms on said intermediate frame section and coacting with both of the outer frame sections to hold the latter in any of the adjusted positions, a foldable platform on the outer frame section provided with the primary wheels, a pair of jointed foldable legs provided with secondary wheels, said legs being articulated on opposite sides of the outer frame member having the handles and adjacent to said handles, said legs when fully extended being substantially the same length as the outer section provided with the primary wheels, and means to selectively fasten the legs in extended positions or to the sides of their respective outer frame sections.

2. A combination picnic cart comprising a pair of companion jointed side rails each consisting of a bridge member and a forward limb articulated on one end of said bridge member and a rear limb articulated on the opposite end of said bridge member, cross-bars connected to said companion side rails being arranged in pairs relative to the bridge members and both the forward and rear limbs to brace and space them, means on the bridge members to temporarily hold the limbs in various adjusted positions relative to their respective bridge members, handles on the outer free ends of the rear limbs, an axle mounted in the free outer ends of the forward limbs of said side rails and projecting across the space between said forward limbs and with the ends of said axle protruding beyond the outer faces of said forward limbs, primary wheels mounted on said protruding ends of the axles, a platform pivoted at the back on said axle between the forward limbs of the side rails to be swung down into an open position or upwardly into a closed position, foldable brackets attached to the platform and said forward limbs of the side rails to support said platform in the open position, a foot for the front end of said platform, a thumb screw to pivotally mount said foot for lateral swinging movements and temporarily hold said foot in raised or lowered positions, jointed foldable legs each comprising a long and short section pivoted together whereby they may fold on each other or be extended lengthwise, means to pivot the free end of each longer section to the outer face of a rear limb of a side rail, a secondary wheel on the free end of each shorter leg section, and means to temporarily hold the short leg section extended relative to the long leg section and in parallel relation to said long leg section and its respective rear limb of a side rail.

3. The structure according to claim 2 wherein the foot is provided with a shoulder to engage an underneath edge of the platform when said foot is in a lowered position.

4. The structure according to claim 2 wherein the means to pivot each leg to its respective side rail limb consists of a thumb screw projected through the longer leg section and threaded into the associated side rail limb and the said longer leg section has a transverse slot in the region of the thumb screw to register with said side rail limb when the leg is at right angles thereto.

5. The structure according to claim 2 wherein the means to hold the short leg section extended relative to the long leg section and in folded position on the rail rear limb consists of a thumb screw projected through the short leg section and selectively registrable with holes in the long leg section on opposite sides of the pivot between the leg sections and also with a hole in the rear side rail limb.

6. A combination picnic cart comprising a frame consisting of three articulated sections each including side rail elements to which cross-bars are secured, handles at the outer ends of the side rail elements of one of the outer frame sections, a pair of primary wheels mounted at the outer end of the other outer frame section, said outer frame sections being of substantially the same length whereby when both of said outer frame sections are swung into substantially parallel positions at right angles to the intermediate frame section said primary wheels and handles may rest upon the same horizontal surface, said frame sections also adapted to be adjusted whereby all of them are in endwise alignment or the intermediate frame section and the outer frame section with the handles are in endwise alignment but at right angles to the other outer frame section or both outer frame sections project in opposite directions at right angles to the intermediate frame section, the side rail elements of said outer frame sections being offset to the respective side rail elements of the intermediate frame section, locking mechanisms each consisting of a locking plate of a length equal to the space between adjacent rail elements of the outer frame sections and selectively cooperating with the sides and ends of the respective side rail elements of the outer frame sections according to the positions of said outer frame sections relative to said intermediate frame section, a pair of rods fixed to each locking plate and slidably mounted on its respective side rail element of said intermediate frame section, springs engaging portions of said rods and the contiguous side rail element to urge the locking plate into the space between the rail element of the outer frame sections, means on said locking plate whereby it may be manually withdrawn from the space between the rail elements of the outer frame sections whereby the latter may be adjusted from one position to another, a foldable platform on the outer frame section provided with the primary wheels, a pair of jointed foldable legs provided with secondary wheels, said legs being articulated on opposite sides of the outer frame member having the handles and adjacent to said handles, said legs when fully extended being substantially the same length as the outer section provided with the primary wheels, and means to selectively fasten the legs in extended positions or to the sides of their respective outer frame sections.

7. A combination picnic cart comprising a frame consisting of three articulated sections each including side rail elements to which cross-bars are secured, handles at the outer ends of the side rail elements of one of the outer frame sections, a pair of primary wheels mounted at the outer end of the other outer frame section, said outer frame sections being of substantially the same length whereby when both of said outer frame sections are swung into substantially parallel positions at right angles to the intermediate frame section said primary wheels and handles may rest upon the same horizontal surface, said frame sections also adapted to be adjusted whereby all of them are in endwise alignment or the intermediate frame section and the outer frame section with the handles are in endwise alignment but at right angles to the other outer frame section or both outer frame sections project in opposite directions at right angles to the intermediate frame section, locking mechanisms on said intermediate frame section and coacting with both of the outer frame sections to hold the latter in any of the adjusted positions, a foldable platform on the outer frame section provided with the primary wheels, foldable braces connected to the sides of the foldable platform and the side rail elements of the outer frame section provided with the primary wheels to support said platform when in the open position, means to hold said platform in the raised position between said side rail elements, a collapsible foot on the free end of said platform to assist in supporting the latter in its open position and prevent tilting of the complete device in one direction, a pair of jointed foldable legs provided with secondary wheels, said legs being articulated on opposite sides of the outer frame member having the handles and adjacent to said handles, said legs when fully extended being substantially the same length as the outer section provided with the primary wheels, and means to selectively fasten the legs in extended positions or to the sides of their respective outer frame sections.

References Cited in the file of this patent

UNITED STATES PATENTS

| | | |
|---|---|---|
| 2,207,307 | Teller | July 9, 1940 |
| 2,325,828 | Betts | Aug. 3, 1943 |
| 2,484,239 | Moon et al. | Oct. 11, 1949 |
| 2,530,166 | Johannsen | Nov. 14, 1950 |

FOREIGN PATENTS

| | | |
|---|---|---|
| 402,361 | Italy | Mar. 4, 1943 |